United States Patent
Derrien et al.

[15] 3,674,888
[45] July 4, 1972

[54] PROCESS FOR SELECTIVELY HYDROGENATING UNSATURATED HYDROCARBONS

[72] Inventors: Michel Derrien; Jean Francois Le Page, both of Rueil Malmaison, France

[73] Assignee: Institut Francias du Petrole des Carburants et Lubrifiants

[22] Filed: Dec. 8, 1970

[21] Appl. No.: 96,277

[30] Foreign Application Priority Data

Dec. 12, 1969 France..................................6943283

[52] U.S. Cl.......................................260/681.5, 260/677 H
[51] Int. Cl............................................................C01c 5/08
[58] Field of Search...................................260/677 H, 681.5

[56] References Cited

UNITED STATES PATENTS 3,116,342  12/1963  Robinson et al...................260/677 H Primary Examiner—Delbert E. Gantz
Assistant Examiner—Veronica O'Keefe
Attorney—Millen, Raptes & White

[57] ABSTRACT

This invention relates to a process for selectively hydrogenating unsaturated hydrocarbons in the liquid phase, in the presence of a catalyst comprising palladium on an alumina carrier, said catalyst resulting from contacting alumina agglomerates of at least a 120 m$^2$/g specific surface with steam at 110° – 300° C. for at least 15 minutes, drying the resulting agglomerates, heating them to a temperature from 500° to 1,200° C., so as to obtain alumina agglomerates of a 40 – 100 m$^2$/g specific surface, admixing said agglomerates with a palladium compound and heating up the resulting mixture to 300° – 600° C.

7 Claims, No Drawings

PROCESS FOR SELECTIVELY HYDROGENATING UNSATURATED HYDROCARBONS

This invention relates to an improved process for selectively hydrogenating unsaturated hydrocarbons.

A known process for selectively hydrogenating unsaturated hydrocarbons, for example those having from three to 10 carbon atoms per molecule, is carried out with catalysts containing nickel or noble metals such as palladium which may be supported on carriers.

These catalysts are not perfectly selective and, moreover, they lose progressively their activity and cannot always be regenerated easily.

The new hydrogenation process according to this invention does not suffer or suffers only to a lesser extent from the above disadvantages.

This process for selectively hydrogenating unsaturated hydrocarbons is carried out in the liquid phase in the presence of a catalyst comprising palladium on an alumina carrier, said catalyst resulting from contacting alumina agglomerates of at least a 120 m²/g specific surface with steam at a temperature of 110° to 300° C. for at least 15 minutes, drying the resulting agglomerates, heating them to a temperature of 500° to 1,200° C. so as to obtain alumina agglomerates of 40 – 100 m²/g specific surface and admixing the latter with a palladium compound and heating the resulting mixture up to 300°–600° C.

The catalyst may be finally treated with hydrogen at a temperature preferably from 50° to 150° C.

The alumina agglomerates have a specific surface of at least 120 m²/g, for example 120 – 400 m²/g. They appear usually as grains of a size from 0.5 to 20 mm, preferably from 1 to 10 mm.

The treatment with water in most cases takes from 0.25 to 24 hours, preferably 1 to 8 hours, the preferred temperature being 150° to 250° C. The pressure may be the atmospheric pressure or any other pressure provided water is present as steam.

The heating step at 500°–1,200° C. may last from 0.25 to 24 hours, preferably 1 to 6 hours, the highest temperatures being associated with the shortest times.

The heating at 300° – 600° C. is preferably carried out in the presence of a molecular oxygen-containing gas.

The palladium amount, expressed as metal, is usually in the range from 0.1 to 3 g per 100 g of alumina.

Other metals may be present as additives.

The treatment with hydrogen may immediately follow the heating step at 300° – 600° C. or may be carried out later, for example in the reaction vessel.

When manufacturing the catalyst, the agglomeration of the alumina of a specific surface higher than 120 m²/g may be carried out according to well-known methods, for example, balls forming, extrusion and the like. The palladium compound, for example palladium chloride or nitrate, may be deposited according to well-known methods. The introduction of alkali metals to reduce the carrier acidity is not necessary, as a rule, since the treatment with water according to this invention and the following heating treatment are sufficient to neutralize this acidity.

According to this invention, the acetylenic and/or diolefinic hydrocarbons may be hydrogenated without substantial hydrogenation of the mono-ethylenic hydrocarbons. The acetylenic hydrocarbons and 1,2-butadiene may be also hydrogenated without substantial hydrogenation of 1,3-butadiene.

The selective hydrogenation treatment may be carried out at a temperature from 0° to 80° C., at a pressure sufficient for maintaining the liquid phase, for Example 1 to 25 kg/cm². The molar ratio of the hydrogen to the unsaturated hydrocarbon is usually 1 to 5 and preferably 1 to 2. The hourly feed rate is for example 2 to 50 (preferably 10 to 25) volumes of liquid per volume of catalyst.

The selective hydrogenation catalysts must have two essential qualities: a high activity so as to provide for the maximal hydrogenation of the most unsaturated compounds, and a high selectivity so as to avoid, besides the main hydrogenation, the parasitic reactions such as the hydrogenation of the less unsaturated compounds and the polymerization of some compounds.

These qualities of the catalyst vary in inverse proportion with respect to each other, i.e.: when the activity of a catalyst is increased, the selectivity is decreased; conversely, when the selectivity is increased, the activity is decreased.

One of the main objects of this invention is to provide, in a selective hydrogenation process, a catalyst which has, as a whole, better performances than the conventional catalyst.

The following, non-limitative examples are given by way of mere illustration:

EXAMPLE I

Alumina agglomerates have been manufactured as follows: wet alumina has been agglomerated to balls of 2 to 6 mm diameter which have been heated thereafter up to 550° C. Their specific surface is then 300 m²/g. One part (A) of these balls have been treated with steam at 190° C. and 1 absolute atmosphere for 6 hours, and then roasted at 800° C. for 4 hours. Another part (B) of the balls has been directly subjected to the latter roasting. A third part (C) of the balls has been roasted at 1,300≅ C.

Each part of the balls have been impregnated with a 5 percent by weight aqueous solution of palladium nitrate, in a sufficient amount to deposit 1 percent by weight of palladium with respect to the dry alumina.

The samples have been dried, maintained at 450° C. for 2 hours and then reduced in a hydrogen stream at 100° C. for 2 hours.

The resulting catalyst had the following characteristics:

TABLE I

| | Specific surface (m²/g) | Porous volume (cm³/g) |
|---|---|---|
| Catalyst A (invention) | 60 | 0.58 |
| Catalyst B | 70 | 0.65 |
| Catalyst C | 6 | 0.42 |

These catalysts have been used to hydrogenate a $C_4$ cut at 15° C. and 15 kg/cm² absolute pressure with a molar ratio of $H_2$ to the impurities of 3 and a hourly feed rate of 25 volumes of liquid per volume of the catalyst.

The $C_4$ cut contained 5 percent of saturated hydrocarbons, 5 percent of mono-olefinic hydrocarbons, 43.5 percent of 1,3-butadiene and 0.5 percent of acetylenic hydrocarbons (methylacetylene, etylacetylene and vinylacetylene). The following relative hydrogenation percentages have been obtained:

TABLE II

| % molar conversion | Catalysts | | |
| | A (invention) | B | C |
|---|---|---|---|
| Mono-olefins | 0 | 0 | 0 |
| Butadiene | 1 | 1 | 0.8 |
| Acetylenics | 98 | 97.5 | 95 |
| Gums | 0.1 | 0.25 | 0.1 |

WHen the feeding rate is reduced with catalyst C so as to obtain the same activity as with catalyst A with respect to the acetylenics, the butadiene conversion is 1.2 percent.

Thus the catalyst according to this invention is both more active and more selective than the catalyst C of low specific surface.

Catalyst A has also the essential advantage, as compared to catalyst B, of being inert with respect to the polymerization by-reaction which results in a quick deactivation of the catalysts. With catalysts A and C the conversion to polymers is only 0.1 percent whereas it attains 0.25 percent with the catalyst B.

EXAMPLE II

The performances of catalysts A and C of example I have been compared in the selective hydrogenation of a $C_4$ cut having a high content of 1,3-butadiene and low contents of 1,2-butadiene and acetylenic hydrocarbons as impurities.

The conditions were as follows:
Total pressure : 10 kg/cm$^2$
Temperature : 15 °C
Molar ratio of hydrogen to impurities : 5
VVH (charge volume/catalyst volume/hour) : 25
The results are given in Table III.

TABLE III

| Feed | | Composition (% by weight) Effluent With Catalyst C | Effluent with Catalyst A |
|---|---|---|---|
| $C_3H_8$ | 0.012 | 0.010 | 0.015 |
| i-$C_4H_{10}$ | 0.47 | 0.48 | 0.52 |
| n-$C_4H_{10}$ | 2.55 | 2.68 | 2.71 |
| 1-$C_4H_8$ | 13.77 | 14.76 | 15.18 |
| iso-$C_4H_8$ | 26.82 | 26.72 | 26.63 |
| 2-trans $C_4H_8$ | 6.23 | 6.86 | 7.21 |
| 2-cis $C_4H_8$ | 4.73 | 5.00 | 5.13 |
| 1,3 $C_4H_6$ | 44.61 | 43.22 | 42.43 |
| 1,2 $C_4H_6$ | 0.20 | 0.16 | 0.14 |
| $C_3H_4$ (1) | 0.08 | 0.02 | 0.009 |
| $C_4H_6$ (2) | 0.103 | 0.044 | 0.017 |
| $C_4H_4$ (3) | 0.425 | 0.046 | 0.009 |

$^1$methylacetylene
$^2$ethylacetylene
$^3$vinylacetylene

The above table shows that catalyst A (94 percent of acetylenics transformed) has a higher activity than catalyst C (82.3 percent)

EXAMPLE III

Catalyst A according to this invention has been compared to catalyst C in order to determine the relative inertness of each of these catalysts with respect to the undesired polymerization by-reaction.

The reaction vessel, i.e. a pipe of 23 mm diameter and 120 cm height, has been filled up with a catalyst containing 0.1 percent of palladium.

The reaction mixture ($C_3$ cut and hydrogenating gas) was flowed upwardly through the pipe. The polymerization was followed up by the formation of certain dimers. The operating conditions were:

P=12 kg/cm$^2$   T=35°C   VVH=20   $H_2/C_3H_4$=1.3

The propylene cut had the following composition (percent by weight):

$C_2H_4$, 0.0710; $C_3H_8$, 6.67; $C_3H_6$, 88.84; $C_3H_6$ (cyclopropane), 0.0770; $C_3H_4$, 1.873; $C_3H_4\ominus$, 2.469.

TABLE IV

| % by weight of polymers | Catalyst A | Catalyst C | Catalyst B |
|---|---|---|---|
| 4-methylpentene | 0.0479 | 0.0484 | 0.0623 |
| 1-hexene | 0.1700 | 0.1400 | 0.2210 |
| 2-hexene | 0.1097 | 0.1137 | 0.1426 |
| 3-hexene | 0.0405 | 0.0420 | 0.0526 |
| Total (% b.w.) | 0.3681 | 0.3441 | 0.4785 |

This table shows that catalyst A according to the present invention has substantially the same polymerization activity as catalyst C with, however, a larger hydrogenation activity.

What we claim as this invention is:

1. A process for selectively hydrogenating unsaturated hydrocarbons in the liquid phase, in the presence of a catalyst comprising palladium on an alumina carrier, said catalyst resulting from contacting alumina agglomerates of at least a 120 m$^2$/g specific surface with steam at 110°–300° C. for at least 15 minutes, drying the resulting agglomerates, heating them to a temperature from 500° to 1,200° C., so as to obtain alumina agglomerates of a 40–100 m$^2$/g specific surface, admixing said agglomerates with a palladium compound and heating up the resulting mixture to 300°–600° C.

2. A process according to claim 1, further comprising contacting the resulting catalyst with hydrogen at 20°–200° C.

3. A process according to claim 1, wherein the initial alumina agglomerates have a specific surface of 120 to 400 m$^2$/g and sizes ranging from 0.5 to 20 mm.

4. A process according to claim 1 wherein said alumina agglomerates are contacted with steam for 0.25 to 24 hours.

5. A process according to claim 1 wherein said resulting agglomerates are heated to 500° – 1,200° C. for 0.25 to 24 hours.

6. A process according to claim 1, wherein the palladium is used in a proportion from 0.1 to 10 g per 100 g of alumina.

7. A process according to claim 1, wherein the heating to 300° – 600° C. is carried out in the presence of a molecular oxygen-containing gas.

* * * * *